US008855652B2

(12) United States Patent
Aoyagi

(10) Patent No.: US 8,855,652 B2
(45) Date of Patent: Oct. 7, 2014

(54) MOBILE COMMUNICATION TERMINAL, NETWORK DEVICE, MOBILE COMMUNICATION SYSTEM, AND MOBILE COMMUNICATION METHOD

(75) Inventor: Kenichiro Aoyagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 206 days.

(21) Appl. No.: 13/512,785

(22) PCT Filed: Nov. 30, 2010

(86) PCT No.: PCT/JP2010/071368
§ 371 (c)(1),
(2), (4) Date: Jun. 28, 2012

(87) PCT Pub. No.: WO2011/065567
PCT Pub. Date: Jun. 3, 2011

(65) Prior Publication Data
US 2012/0264475 A1    Oct. 18, 2012

(30) Foreign Application Priority Data
Nov. 30, 2009   (JP) .................................. 2009-272450

(51) Int. Cl.
*H04W 36/00*    (2009.01)
*H04W 48/04*    (2009.01)
*H04W 84/04*    (2009.01)
*H04W 24/10*    (2009.01)

(52) U.S. Cl.
CPC ............ *H04W 48/04* (2013.01); *H04W 84/045* (2013.01); *H04W 24/10* (2013.01)
USPC .......... 455/444; 455/517; 455/67.11

(58) Field of Classification Search
CPC .......................... H04W 84/045; H04W 52/244
USPC ........... 455/436, 67.11, 444, 517, 450, 452.2; 370/328, 310
See application file for complete search history.

(56) References Cited

U.S. PATENT DOCUMENTS 7,292,863 B2 *  11/2007  Chen et al. .................. 455/452.2
7,526,257 B2 *   4/2009  Ogura ............................ 455/78
(Continued)

FOREIGN PATENT DOCUMENTS

| CN | 101472317 A | 7/2009 |
|----|-------------|--------|
| CN | 101505476 A | 8/2009 |
| JP | 2010 511320 | 4/2010 |

OTHER PUBLICATIONS

3 GPP TS 36.331 V8.6.0, "$3^{rd}$ Generation Partnership Project; Technical Specification Group Radio Access Network; Evolved Universal Terrestrial Radio Access (E-UTRA); Radio Resource Control (RRC); Protocol specification," Total 207 pages, (Jun. 2009).

(Continued)

*Primary Examiner* — Sonny Trinh
(74) *Attorney, Agent, or Firm* — Oblon, Spivak, McClelland, Maier & Neustadt, L.L.P.

(57) ABSTRACT

A mobile communication system 100 is configured to determine whether to or not to measure a reception quality of a signal broadcasted from the specific cell, based on at least one piece of information of a moving speed of the mobile communication terminal 10, location information of the mobile communication terminal 10, and a usage state of the specific cell. The mobile communication terminal 10 is configured to measure the reception quality of the signal broadcasted from the specific cell when it is determined that the reception quality of a signal broadcasted from the specific cell has to be measured.

9 Claims, 6 Drawing Sheets

(56) References Cited

U.S. PATENT DOCUMENTS

| | | | |
|---|---|---|---|
| 7,668,547 B2 * | 2/2010 | Sanchez et al. | 455/436 |
| 7,697,474 B2 * | 4/2010 | Aoyama et al. | 370/328 |
| 8,219,100 B2 * | 7/2012 | Bao et al. | 455/444 |
| 8,463,278 B2 * | 6/2013 | Hamada | 455/450 |
| 8,611,237 B2 * | 12/2013 | Lee et al. | 370/252 |
| 8,738,007 B2 * | 5/2014 | Lee et al. | 455/441 |
| 2009/0303893 A1 | 12/2009 | Lee et al. | |
| 2012/0264475 A1 * | 10/2012 | Aoyagi | 455/517 |

OTHER PUBLICATIONS

International Search Report Issued Jan. 11, 2011 in PCT/JP10/071368 Filed Nov. 30, 2010.

Office Action issued Mar. 28, 2014, in Chinese Patent Application No. 201080054022.6.

* cited by examiner

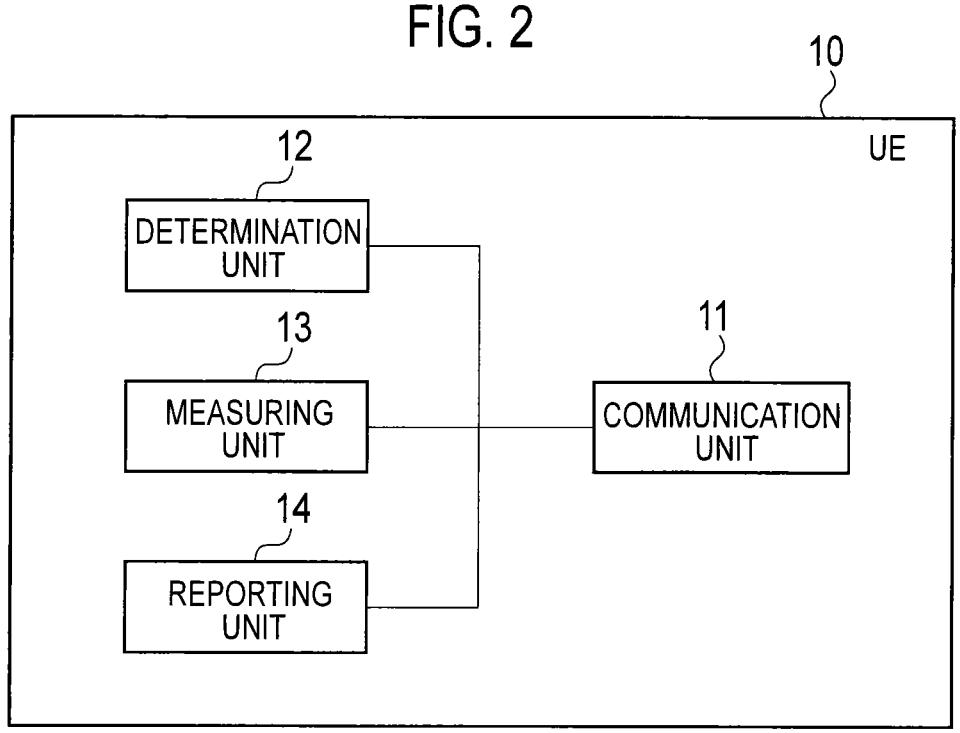
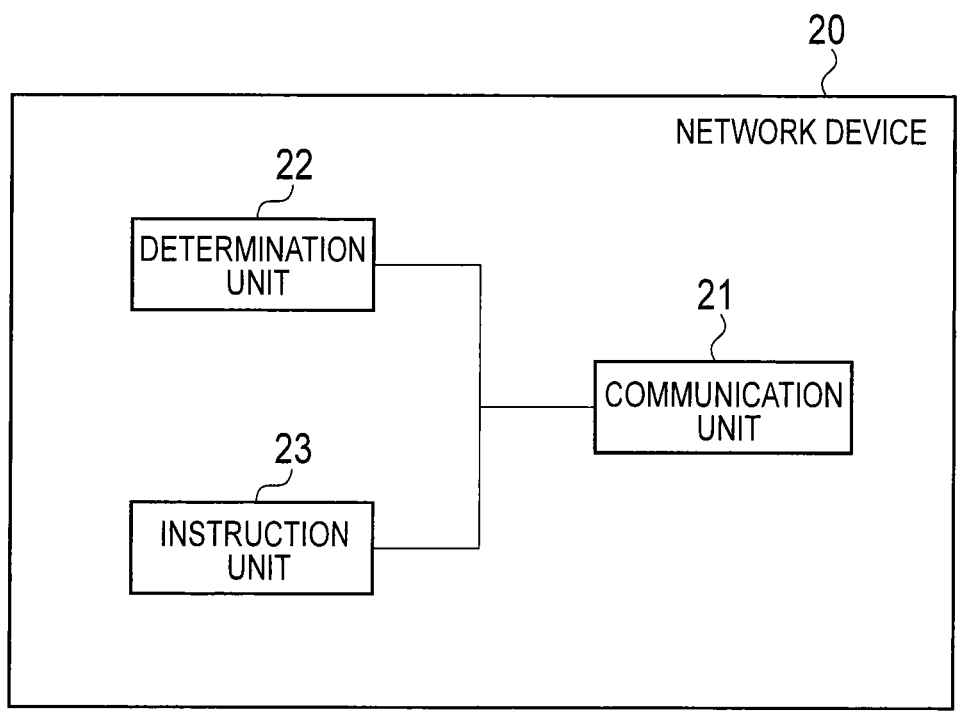

FIG. 4

| ACCESS MODE |
|---|
| >HYBRID |
| >CLOSED |
| NECESSITY OF DETERMINING ACCESS RIGHT |
| >OFF |
| NECESSITY OF REPORTING SPECIFIC CELL IDENTIFIER |
| >ON |

MOBILE COMMUNICATION TERMINAL, NETWORK DEVICE, MOBILE COMMUNICATION SYSTEM, AND MOBILE COMMUNICATION METHOD

TECHNICAL FIELD

The present invention relates to a mobile communication system having a specific cell that an access mode is configurable, a mobile communication terminal, a network device, and a mobile communication method used in the mobile communication system.

BACKGROUND ART

There have been known specific cells that are referred to as CSG (Closed Subscriber Group) cells, home cells, and femtocells. Note that an access mode can be set for a specific cell. The access modes are "Closed", "Hybrid", or "Open".

A "Closed" mode specific cell is configured to permit only an access of a specific UE (User Equipment). A "Hybrid" mode specific cell is configured to allow a specific UE to enjoy higher quality communication than other UEs. An "Open" mode specific cell is configured to permit accesses of all the UEs like a general macrocell.

Here, an UE has to measure a reception quality of a signal (e.g., a pilot channel) broadcasted from the specific cell in handover from a macrocell to the specific cell, and report the measured result to a network side.

In this regard, the 3GPP standards have regulations that a network side should provide an UE with a list (NCL: Neighbor Cell List) of cells whose reception qualities should be measured/reported (e.g., non-patent document 1).

Accordingly, according to the 3GPP standards, a reception quality of a signal broadcasted from a specific cell can be measured/reported by a UE selectively depending on if the specific cell is or is not included in the list of cells (NCL) whose reception qualities should be measured/reported.

PRIOR ART DOCUMENT

Non-Patent Document

Non-patent Document 1: 3GPP TS36.331 v8.6.0

SUMMARY OF THE INVENTION

However, in a case where a large number of specific cells each having a service smaller than a macrocell are provided, it is difficult for a network side to manage/control whether or not to include a specific cell in a list of cells (NCL) whose reception qualities should be measured/reported.

In addition, in a communication system not using a list of cells (NCL) whose reception qualities should be measured/reported, such as LTE (Long Term Evolution), a reception quality of a signal broadcasted from the specific cell cannot be measured/reported by a UE.

For this reason, the present invention has been made with a view to solving the foregoing problems. Accordingly, an objective of the present invention is to provide a mobile communication terminal, a network device, a communication system, and a mobile communication method, which enable selective measurement/report of a reception quality of a signal broadcasted from a specific cell.

A mobile communication terminal according to the first feature of the present invention is configured to communicate with a network device in a mobile communication system having a specific cell that an access mode is configurable, the mobile communication terminal includes: a determination unit configured to determine whether or not to measure a reception quality of a signal broadcasted from the specific cell, based on at least one piece of information of a moving speed of the mobile communication terminal, location information of the mobile communication terminal, and a usage state of the specific cell; and a measuring unit configured to measure the reception quality of the signal broadcasted from the specific cell if it is determined that the reception quality of the signal broadcasted from the specific cell has to be measured.

In the first feature, the mobile communication terminal may further include a reporting unit configured to report to the network device whether or not the mobile communication terminal has a right to access the specific cell.

In the first feature, the mobile communication terminal may further include a reporting unit configured to report an identifier of the specific cell to the network device.

A network device according to the second feature of the present invention is configured to communicate with a mobile communication terminal in a mobile communication system having a specific cell that an access mode is configurable, the network device includes: a determination unit configured to determine whether or not to cause the mobile communication terminal to measure a reception quality of a signal broadcasted from the specific cell, based on at least one piece of information of a moving speed of the mobile communication terminal, location information of the mobile communication terminal, and a usage state of the specific cell; and an instruction unit configured to instruct the mobile communication terminal to measure the reception quality of the signal broadcasted from the specific cell if it is determined that the mobile communication terminal has to measure the reception quality of the signal broadcasted from the specific cell.

In the second feature, the instruction unit may instruct the mobile communication terminal to report whether or not the mobile communication terminal has a right to access the specific cell.

In the second feature, the instruction unit may instruct the mobile communication terminal to report an identifier of the specific cell.

In the second feature, the instruction unit may inform the mobile communication terminal of an access mode set for the specific cell whose reception quality has to be measured by the mobile communication terminal.

A mobile communication system according to the third feature of the present invention has a specific cell in which an access mode is configurable, the mobile communication system includes: a determination unit configured to determine whether o or not to measure a reception quality of a signal broadcasted from the specific cell, based on at least one piece of information of a moving speed of the mobile communication terminal, location information of the mobile communication terminal, and a usage state of the specific cell, wherein the mobile communication terminal is configured to measure the reception quality of the signal broadcasted from the specific cell when it is determined that the reception quality of a signal broadcasted from the specific cell has to be measured.

A mobile communication method according to the fourth feature of the present invention applied to a mobile communication system having a specific cell that an access mode is configurable, the mobile communication method includes the steps of: determining whether or not to measure a reception quality of a signal broadcasted from the specific cell, based on at least one piece of information of a moving speed of the mobile communication terminal, location information of the mobile communication terminal, and a usage state of the specific cell; and measuring the reception quality of the signal broadcasted from the specific cell by the mobile communication terminal when it is determined that the reception quality of a signal broadcasted from the specific cell has to be measured.

BRIEF DESCRIPTION OF THE DRAWINGS

FIG. 2 is a diagram showing a UE 10 according to the first embodiment.

FIG. 3 is a diagram showing a network device 20 according to the first embodiment.

FIG. 4 is a table showing one example of an instruction format according to the first embodiment.

MODES FOR CARRYING OUT THE INVENTION

Figure 1:
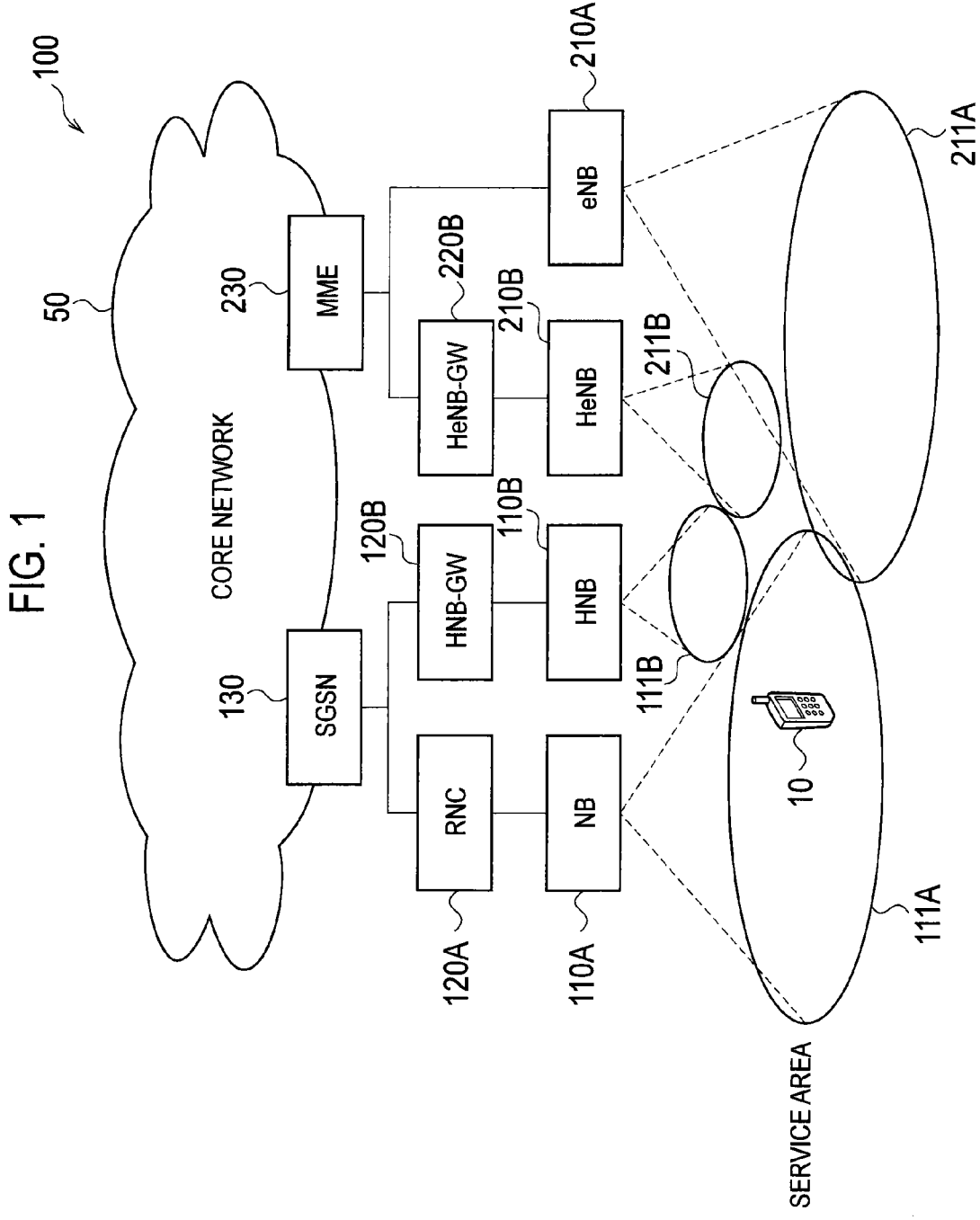
FIG. 1 is a diagram showing a mobile communication system 100 according to a first embodiment.

A mobile communication system according to an embodiment of the invention is described below by referring to the drawings. In the following description of the drawings, the same or similar reference numerals are given to denote the same or similar portions.

Note that the drawings are merely schematically shown and proportions of sizes and the like are different from actual ones. Thus, specific sizes and the like should be judged by referring to the description below. In addition, there are of course included portions where relationships or percentages of sizes of the drawings are different among the drawings.

[Summary of the Embodiment]

A mobile communication system according to an embodiment includes a mobile communication terminal and a network device and has a specific cell that an access mode is configurable. The mobile communication terminal or the network device is configured to determine whether or not to measure a reception quality of a signal broadcasted from the specific cell, based on at least one piece of information of a moving speed of a mobile communication terminal, location information of the mobile communication terminal, and a usage state of the specific cell. The mobile communication terminal is configured to measure the reception quality of a signal broadcasted from the specific cell when it is determined that the reception quality of a signal broadcasted from the specific cell has to be measured.

In the embodiment, it is determined whether or not to measure the reception quality of a signal broadcasted from the specific cell, based on at least one piece of information of a moving speed of a mobile communication terminal, location information of the mobile communication terminal, and a usage state of the specific cell. Accordingly, the reception quality of a signal broadcasted from the specific call can be selectively measured/reported.

Note that it is preferable in the embodiment that specific cells be installed in small and large scales. It is preferable that the specific cell be configured of HNB (Home Node B), eHNB (Evolved Home Node B), FemtoBTS, and the like.

[First Embodiment]

(Configuration of Mobile Communication System)

The configuration of a mobile communication system according to a first embodiment is described below by referring to the drawings. FIG. 1 is a diagram showing a mobile communication system 100 according to the first embodiment.

As shown in FIG. 1, the mobile communication system 100 includes a communication terminal device 10 (hereinafter, UE 10), and a core network 50. In addition, the mobile communication system 100 includes a first communication system and a second communication system.

For example, the first communication system 100 is a communication system corresponding to UMTS (Universal Mobile Telecommunication System). The first communication system has a base station 110A (hereinafter NB 110A), a home base station 110B (hereinafter HNB 110B), a RNC 120A, a home base station gateway 120B (hereinafter, HNB-GW 120B), and an SGSN 130.

Note that a radio access network (UTRAN; Universal Terrestrial Radio Access Network) corresponding to the first communication system is configured of the NB 110A, HNB 110B, RNC 120A, and HNB-GW 120B.

For example, the second communication system is a communication system corresponding to LTE (Long Term Evolution). The second communication system has a base station 210A (hereinafter eNB 210A), a home base station 210B (hereinafter HeNB 210B), a home base station gateway 220B (hereinafter, HeNB-GW 220B), and an MME 230.

Note that a radio access network (E-UTRAN; Evolved Universal Terrestrial Radio Access Network) corresponding to the second communication system is configured of the eNB 210A, HeNB 210B, and HeNB-GW 220B.

The UE 10 is a device (User Equipment) configured to communicate with the first communication system and the second communication system. For example, the UE 10 has a function to perform radio communications with the NB 110A and the HNB 110B and a function to perform radio communications with the eNB210A and the HeNB 210B.

The NB 110A has a macrocell 111A and is a device (NodeB) to perform radio communications with the UE 10 present in the macrocell 111A.

The HNB 110B has a specific cell 111B and is a device (Home NodeB) to perform radio communications with the UE 10 present in the specific cell 111B.

The RNC 120A is connected with the NB 110A and is a device (Radio Network Controller) to establish a radio connection (RRC Connection) with the UE 10 present in the macrocell 111A.

The HNB-GW 120B is connected with the HNB 110B and is a device (Home NodeB Gateway) to establish a radio connection (RRC Connection) with the UE 10 present in the specific cell 111B.

The SGSN 130 is a device (Serving GPRS Support Node) to exchange packets in a packet exchange domain. The SGSN 130 is provided in the core network 50. Although it is omitted in FIG. 1, a device (MSC; Mobile Switching Center) to perform line switching in a line switching domain may be provided in the core network 50.

The eNB 210A has a macrocell 211A and is a device (evolved NodeB) to perform radio communications with the UE 10 present in the macrocell 211A.

The HeNB 210B has a specific cell 211B and is a device (Home evolved NodeB) to perform radio communications with the UE 10 present in the specific cell 211B.

The HeNB-GW 220B is connected with the HeNB 210B and is a device (Home evolved NodeB Gateway) to manage the HeNB 210B.

The MME 230 is connected with the HeNB 220B via the HeNB-GW210B and is a device (Mobility Management Entity) to manage mobility of the UE 10 establishing the radio connection with the HeNB 210B.

Note that the macrocell and the specific cell should be understood as functions to perform radio communications with the UE 10. However, the macrocell and the specific cell are also used as terms to indicate a service area of a cell. Also, a cell such as the macrocell or the specific cell is recognized by a frequency, diffusion code, or time slot, which is used in the cell.

The specific cell is sometimes referred to as a femtocell, CSG (Closed Subscriber Group), or a home cell. Also, the specific cell is configured so that an access mode to specify a UE 10 allowed to access the specific cell can be set. The access mode is "Closed", "Hybrid", or "Open".

The "Closed" mode specific cell is configured to permit only an access of a specific UE 10 managed by the specific cell.

The "Hybrid" mode specific cell is configured to allow a specific UE 10 managed by the specific cell to perform high quality communication, while allowing other UEs 10 not managed by the specific cell to perform best effort quality communication.

The "Open" mode specific cell is configured to permit accesses of all UEs 10 like the macrocell. Note that in the "Open" mode cell, the communication qualities of the UEs 10 are the same irrespective of whether or not each UE is managed by the specific cell.

Note that the access mode maybe an "ACCESS CLASS BARED" to prohibit an access of the UE 10 for each access class, or a "CELL BARRED" to prohibit an access of UE 10 for each cell.

(Configuration of Mobile Communication Terminal)

The configuration of the mobile communication terminal according to the first embodiment is described below by referring to the drawings. FIG. 2 is a drawing showing the UE 10 according to the first embodiment. As shown in FIG. 3, the UE 10 has a communication unit 11, a determination unit 12, a measuring unit 13, and a reporting unit 14. Note that it is assumed that the UE 10 manages a specific cell accessible by the UE 10.

The communication unit 11 performs radio communications with the NB 110A and the HNB 110B. Also, the communication unit 11 performs radio communications with the eNB 210A and the HeNB 210B.

The determination unit 12 determines whether or not to measure a reception quality of a signal (e.g., a pilot channel) broadcasted from the specific cell provided in the HNB 110B or the HeNB210B. Specifically, the determination unit 12 determines whether or not to measure the reception quality of a signal broadcasted from the specific cell, based on at least one piece of information of a moving speed of the UE 10, location information of the UE 10, and a usage state of the specific cell. In addition, the determination unit 12 may determine whether or not to measure the reception quality of a signal broadcasted from the specific cell, based on the existence of a right to access the specific cell.

Note that the usage state of the specific cell is the information showing a state of congestion of the specific cell, which is the number of UEs 10 using the specific cell, transmission power, or a usage state of a channelization code, or the like.

For example, the determination unit 12 determines that the reception quality of a signal broadcasted from the specific cell has to be measured when the moving speed of the UE 10 is equal to or lower than a certain speed. On the other hand, when the moving speed of the UE 10 is higher than the certain speed, the determination unit 12 determines that the reception quality of a signal broadcasted from the specific cell does not have to be measured. Note that the determination unit 12 may determine the moving speed of the UE 10 with a sensor or may determine the moving speed of the UE 10 with a frequency of handover.

Instead, the determination unit 12 determines that the reception quality of a signal broadcasted from the specific cell has to be measured when the location information of the UE 10 indicates a predetermined location. On the other hand, when the location information of the UE 10 does not indicate the predetermined location, the determination unit 12 determines that the reception quality of a signal broadcasted from the specific cell does not have to be measured. Note that the determination unit 12 may determine the location information of the UE 10 with a GPS function or may determine the location information of the UE 10 with another method. For example, the "predetermined location" is determined based on a location of the specific cell accessible by the UE 10.

Alternatively, the determination unit 12 determines that the reception quality of a signal broadcasted from the specific cell has to be measured when the number of UEs 10 using the specific cell is equal to or smaller than a certain number. On the other hand, when the number of UEs 10 using the specific cell is larger than the certain number, the determination unit 12 determines that the reception quality of a signal broadcasted from the specific cell does not have to be measured. Note that the determination unit 12 determines a usage state of the specific cell by acquiring a usage state of the specific cell (the number of UEs 10 using the specific cell) from the network device (the HNB 110B, HNB-GW 120B, HeNB-GW 220B) which manages the specific cell through the network device 20 to be described later.

Or, the determination unit 12 determines that the reception quality of a signal broadcasted from the specific cell has to be measured when the UE 10 has a right to access the specific cell. On the other hand, when the UE 10 does not have a right to access the specific cell, the determination unit 12 determines that the reception quality of a signal broadcasted from the specific cell does not have to be measured.

Here, the determination unit 12 may determine the access mode ("Closed", "Hybrid", "Open") set for the specific cell whose reception quality should be measured, based on a piece of information of the moving speed of the UE 10, the location information of the UE 10, and the usage state of the specific cell. The determination unit 12 identifies the specific cell whose reception quality should be measured based on the access mode ("Closed", "Hybrid", "Open") and determines that the reception quality of a signal broadcasted from the identified specific cell has to be measured.

For example, for the specific cell performing a limited-area service like a specific cell in which the "Closed" or "Hybrid" mode is set, the determination unit 12 may determine that the reception quality of a signal broadcasted from the specific cell does not have to be measured when the moving speed of the UE 10 is high. Instead, when the location of the UE 10 is far from the specific cell performing the limited-area service like the specific cell in which the "Closed" or "Hybrid" mode is set, the determination unit 12 may determine that the reception quality of a signal broadcasted from the specific cell does not have to be measured.

Alternatively, for the specific cell in which the "Hybrid" or "Open" mode is set, the determination unit 12 may determine that the reception quality of a signal broadcasted from the specific cell does not have to be measured when the usage state of the specific cell is more congested than a predetermined threshold. The predetermined threshold is determined by a level at which the specific cell is not accessible due to its congestion, or a level at which a user cannot receive an expected service (a level at which throughput is significantly deteriorated). It is preferable to measure such levels in advance.

As described above, there is given of a case as an example here that the UE 10 autonomously determines whether or not to measure the reception quality of a signal broadcasted from the specific cell. However, the embodiment is not limited to that case.

For example, the determination unit 12 may determine whether or not to measure the reception quality of a signal broadcasted from the specific cell, based on an instruction from the network device 20 to be described later. For example, an instruction from the network device 20 includes a determination result made by the network device 20 and the determination unit 12 may determine whether or not to measure the reception quality of a signal broadcasted from the specific cell, based on the determination result made by the network device 20. Instead, an instruction from the network device 20 may include the access mode ("Closed", "Hybrid", "Open") set for a specific cell whose reception quality should be measured, and the determination unit 12 may identify the specific cell whose reception quality should be measured according to the access mode ("Closed", "Hybrid", "Open") and may determine that the reception quality of a signal broadcasted from the identified specific cell has to be measured.

The measuring unit 13 measures a reception quality of a signal broadcasted from a macrocell or a specific cell. As for the microcell, the measuring unit 13 measures the reception quality of a signal broadcasted from the macrocell found by a cell search or the like.

On the other hand, as for the specific cell, the measuring unit 13 measures the reception quality of a signal broadcasted from the specific cell based on the determination result made by the determination unit 12. For example, if it is determined that the reception quality has to be measured, the measuring unit 13 measures the reception quality of a signal broadcasted from the specific cell. If it is determined that the reception quality does not have to be measured, the measuring unit 13 does not measure the reception quality of a signal broadcasted from the specific cell.

The reporting unit 14 reports the reception quality measured by the measuring unit 13 to the network device 20 to be described later.

In addition, the reporting unit 14 reports whether or not the UE 10 has a right to access the specific cell found by a cell search or the like (the existence of an access right) to the network device 20 to be described later. The reporting unit 14 reports an identifier of the specific cell found by a cell search or the like (e.g., "CSG ID") to the network device 20 to be described later.

If the reception quality of the signal broadcasted from the specific cell is measured, the reporting unit 14 may autonomously report the presence of absence of a right to access the specific cell or an identifier of the specific cell. Instead, the reporting unit 14 may report the presence or absence a right to access the specific cell or an identifier of the specific cell based on the instruction from the network device 20 to be described later.

(Configuration of Network Device)

The configuration of the network device according to the first embodiment is described below by referring to the drawings. FIG. 3 is a drawing showing the network device 20 according to the first embodiment. As shown in FIG. 3, the network device 20 has a communication unit 21, a determination unit 22, and an instruction unit 23.

Note that the network device 20 is a device to manage a macrocell in which the UE 10 is performing a location registration. For example, when the UE 10 is performing the location registration in the macrocell 111A, the network device 20 is a RNC 120A. Also, when the UE 10 is performing the location registration in a macrocell 211A, the network device 20 is an eNB 210A.

The communication unit 21 performs communications with the UE 10. Moreover, the communication unit 21 performs communications with other network devices (HNB 110B, HNB-GW 120B, HeNB 210B, HeNB-GW 220B, and the like).

The determination unit 22 determines whether or not to cause the UE 10 to measure the reception quality of a signal (e.g., a pilot channel) broadcasted from the specific cell. Specifically, the determination unit 22 determines whether or not to cause the UE 10 to measure the reception quality of a signal broadcasted from the specific cell, based on at least one piece of information of the moving speed of the UE 10, the location information of the UE 10, and the usage state of the specific cell. In addition, the determination unit 22 may determine whether or not to cause the UE 10 to measure the reception quality of a signal broadcasted from the specific cell, based on the existence of a right to access the specific cell.

For example, the determination unit 22 determines that the UE 10 has to measure the reception quality of a signal broadcasted from the specific cell when the moving speed of the UE 10 is equal to or lower than a certain speed. On the other hand, when the moving speed of the UE 10 is higher than a certain speed, the determination unit 22 determines that the UE 10 does not have to measure the reception quality of a signal broadcasted from the specific cell. Note that the determination unit 22 may specify the moving speed of the UE 10 by acquiring the moving speed of the UE 10 from the UE 10 or may specify the moving speed of the UE 10 by a frequency of handover.

Alternatively, the determination unit 22 determines that the UE 10 has to measure the reception quality of a signal broadcasted from the specific cell when the location information of the UE 10 indicates a predetermined location. On the other hand, when the location information of the UE 10 does not indicate the predetermined location, the determination unit 22 determines that the UE 10 does not have to measure the reception quality of a signal broadcasted from the specific cell. Note that the determination unit 22 may determine the location information of the UE 10 by acquiring the location information of the UE 10 from the UE 10 or may determine the location information of the UE 10 by another method.

Otherwise, the determination unit 22 determines that the UE 10 has to measure the reception quality of a signal broadcasted from the specific cell when the number of UEs 10 using the specific cell is equal to or smaller than a certain number. On the other hand, when the number of UEs 10 using the specific cell is larger than the certain number, the determination unit 22 determines that the UE 10 does not have to measure the reception quality of a signal broadcasted from the specific cell. Note that the determination unit 22 determined the usage state of the specific cell by acquiring the usage state of the specific cell (the number of UEs 10 using the specific cell) from another network device (the HNB 110B, HNB-GW 120B, HeNB 210B, HeNB-GW 220B) which manages the specific cell.

Instead, the determination unit 22 determines that the UE 10 has to measure the reception quality of a signal broadcasted from the specific cell when the UE 10 has a right to access the specific cell. On the other hand, when the UE 10 does not have a right to access the specific cell, the determination unit 22 determines that the UE 10 does not have to measure the reception quality of a signal broadcasted from the specific cell.

The determination unit 22 may determine an access mode ("Closed", "Hybrid", "Open") set for the specific cell whose reception quality should be measured, based on a piece of information of a moving speed of the LTE 10, location information of the LTE 10, and usage state of the specific cell. For example, for the specific cell performing a limited-area service like the specific cell in which the "Closed" or "Hybrid" mode is set, the determination unit 22 may determine that the reception quality of a signal broadcasted from the specific cell does not have to be measured when the moving speed of the UE 10 is high. Instead, when the location of the LTE 10 is far from the specific cell performing the limited-area service like the specific cell in which the "Closed" or "Hybrid" mode is set, the determination unit 22 may determine that the reception quality of a signal broadcasted from the specific cell does not have to be measured.

Alternatively, for the specific cell in which the "Hybrid" or "Open" mode is set, the determination unit 22 may determine that the reception quality of a signal broadcasted from the specific cell does not have to be measured when the usage state of the specific cell is more congested than a predetermined threshold. The predetermined threshold is determined by a level at which the specific cell is not accessible due to its congestion, or a level at which a user cannot receive an expected service (a level at which throughput is significantly deteriorated). It is preferable to measure such levels in advance.

The instruction unit 23 instructs the UE 10 to measure the reception quality of a signal broadcasted from the specific cell based on the determination result made by the determination unit 22. Specifically, the instruction unit 23 instructs the UE 10 to measure the reception quality of a signal broadcasted from the specific cell when it is determined that the UE 10 has to measure the reception quality of a signal broadcasted from the specific cell. On the other hand, the instruction unit 23 does not instruct the UE 10 to measure the reception quality of a signal broadcasted from the specific cell when it is determined that the UE 10 does not have to measure the reception quality of a signal broadcasted from the specific cell. Instead, the instruction unit 23 instructs the UE 10 not to measure the reception quality of a signal broadcasted from the specific cell when it is determined that the UE 10 does not have to measure the reception quality of the signal broadcasted from the specific cell.

In addition, the instruction unit 23 may instruct the UE 10 to report whether or not the UE 10 has a right to access the specific cell (the existence of an access right). Instead, the instruction unit 23 instructs the UE 10 to report an identifier of the specific cell (e.g., "CSG ID").

Note that the above-described determination unit 22 determines whether or not the UE 10 has a right to access the specific cell based on the existence of the right to access the specific cell reported from the UE 10. Otherwise, the above-described determination unit 22 may inquire of the device managing the specific cell (the HeNB 210B, HeNB-GW 220B) the existence of the right to access the specific cell based on an identifier of the specific cell reported from the UE 10.

Furthermore, the instruction unit 23 may inform the access mode determined by the determination unit 22, i.e., the access mode ("Closed", "Hybrid", "Open") set for the specific cell whose reception quality should be measured.

For example, the UE 10 is informed of the various pieces of information by the instruction unit 23 using a format shown in FIG. 4. As shown in FIG. 4, in the column of "access mode", an access mode (here, "Closed", "Hybrid") set for the specific cell whose reception quality should be measured is written. In the column of "access right determination necessity", information instructing whether to determine/report the existence of the right to access the specific cell (here, "OFF") is written. In the column of "specific cell identifier reporting necessity", information instructing whether or not to determine/report the identifier of the specific cell (here, "ON") is written.

As shown in FIG. 4, the UE 10 reports the reception quality of the signal broadcasted from the specific cell in the "Closed" or "Hybrid" mode to the network device 20. Also, the UE 10 reports the identifier of the specific cell found by a cell search to the network device 20. On the other hand, the network device 20 inquires of the device managing the specific cell (the HeNB 210B, HeNB-GW 220B) about the presence or absence of the right to access the specific cell based on an identifier of the specific cell reported from the UE 10.

Note that the instruction to be made by the network device (the instruction unit 23) to the UE 10 may be broadcasted by broadcasting information (e.g., System Information Block) or may be notified by individual piece of information (e.g., Measurement Control).

(Operation of Mobile Communication System)

Figure 5:
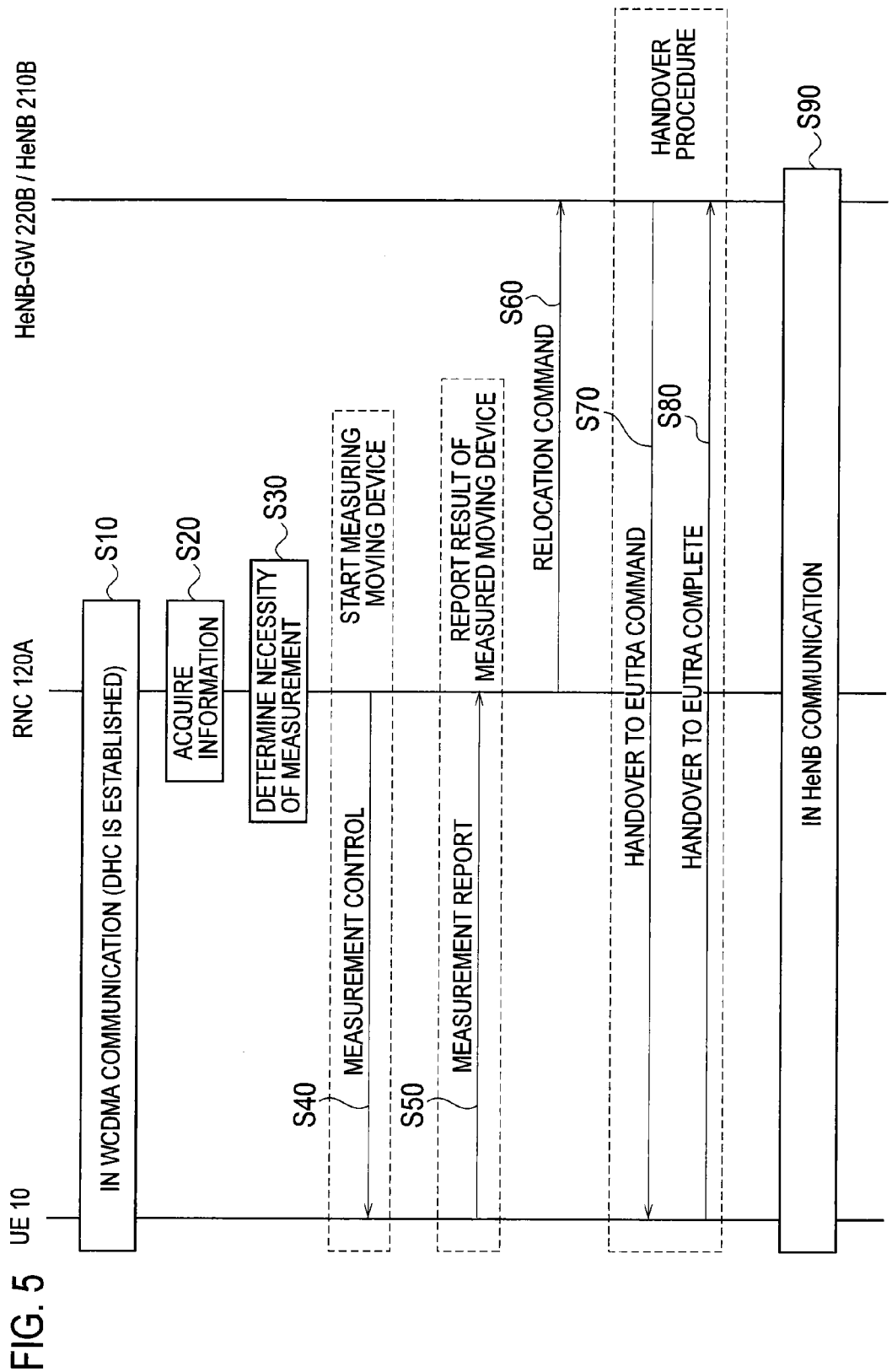
FIG. 5 is a sequence diagram showing an operation of the mobile communication system according to the first embodiment.

The operation of the mobile communication system according to the first embodiment is described below by referring to the drawings. FIG. 5 is a sequence diagram showing an operation of the mobile communication system 100 according to the first embodiment.

Such an example is given here that the UE 10 is communicating with the first communication system (the macrocell 111A) and the network device 20 (the RNC 120A) determines the necessity of measuring the reception quality of a signal broadcasted from the specific cell. In addition, an example of a handover from the first communication system (the macrocell 111A) to the second communication system (the specific cell 211B) is given.

As shown in FIG. 5, at step S10, the UE 10 is communicating with the first communication system (the macrocell 111A).

At step S20, the RNC 120A acquires information required for determining the necessity of measuring the reception quality of a signal broadcasted from the specific cell 211B. For example, the RNC 120A acquires a moving speed of the UE 10, location information of the UE 10, and the usage state of the specific cell 211B.

At step S30, the RNC 120A determines whether or not to cause the UE 10 to measure the reception quality of a signal broadcasted from the specific cell, based on at least one piece of information of the moving speed of the UE 10, the location information of the UE 10, and the usage state of the specific cell.

At step S40, the RNC 120A transmits "Measurement Control" to the UE 10. Note that "Measurement Control" contains information indicating whether or not to cause the UE 10 to measure the reception quality of a signal broadcasted from the specific cell 211B. Moreover, the "Measurement Control" may contain information (e.g., "Access mode" shown in FIG. 4) showing an access mode ("Closed", "Hybrid", "Open") set for the specific cell whose reception quality should be measured, information (e.g., "Necessity of determining an access right" shown in FIG. 4) instructing the UE 10 to report whether or not the UE 10 has a right to access the specific cell or information (e.g., "Necessity of reporting specific cell identifier" as shown in FIG. 4) instructing the UE 10 to report an identifier of the specific cell (e.g., "CSG ID").

At step S50, the UE 10 determines whether or not to measure the reception quality of a signal broadcasted from the specific cell 211B, based on the determination result made by the RNC 120A. Subsequently, the UE 10 measures the reception quality of a signal broadcasted from the specific cell 211B when it is determined that the reception quality of a signal broadcasted from the specific cell 211B has to be measured. On the other hand, the UE 10 does not measure the reception quality of a signal broadcasted from the specific cell 211B when it is determined that the reception quality of the signal broadcasted from the specific cell 211B does not have to be measured.

Note that, when the "Measurement Control" indicates the access mode set for the specific cell whose reception quality should be measured, the UE 10 determines whether or not the "Measurement Control" indicates the access mode set for the specific cell 211B as a specific cell whose reception quality should be measured. Subsequently, the UE 10 measures the reception quality of a signal broadcasted from the specific cell 211B when "Measurement Control" indicates the access mode set for the specific cell 211B. On the other hand, the UE 10 does not measure the reception quality of a signal broadcasted from the specific cell 211B when "Measurement Control" does not indicate the access mode set for the specific cell 211B.

Such an example is given here that it is determined that the reception quality of a signal broadcasted from the specific cell 211B has to be measured. Accordingly, the UE 10 reports to the RNC 120A the information (Measurement Report) indicating the reception quality of a signal broadcasted from the specific cell 211B.

At step S60, the RNC 120A transmits information (Relocation Command) requiring handover from the macrocell 111A to the specific cell 211B to the HeNB 210B (or the HeNB-GW 220B).

At step S70, the HeNB 210B (or the HeNB-GW 220B) transmits information (Handover Command) requiring handover from the macrocell 111A to the specific cell 211B to the UE 10.

At step S80, the UE 10 transmits information (Handover Complete) showing that the handover from the macrocell 111A to the specific cell 211B is completed to the HeNB 210B (or the HeNB-GW 220B).

At step S90, the UE 10 communicates with the second communication system (the specific cell 211B).

(Advantageous Effects)

In the first embodiment, the UE 10 or the network device 20 determines whether or not to measure the reception quality of a signal broadcasted from a specific cell, based on at least one piece of information of a moving speed of the UE 10, location information of the UE 10, and a usage state of the specific cell. Accordingly, the reception quality of a signal broadcasted from the specific call can be selectively measured/reported.

[Modification 1]

Modification 1 of the first embodiment is described below by referring to the drawings. In the following description, portions different from those of the first embodiment are mainly described.

Figure 6:
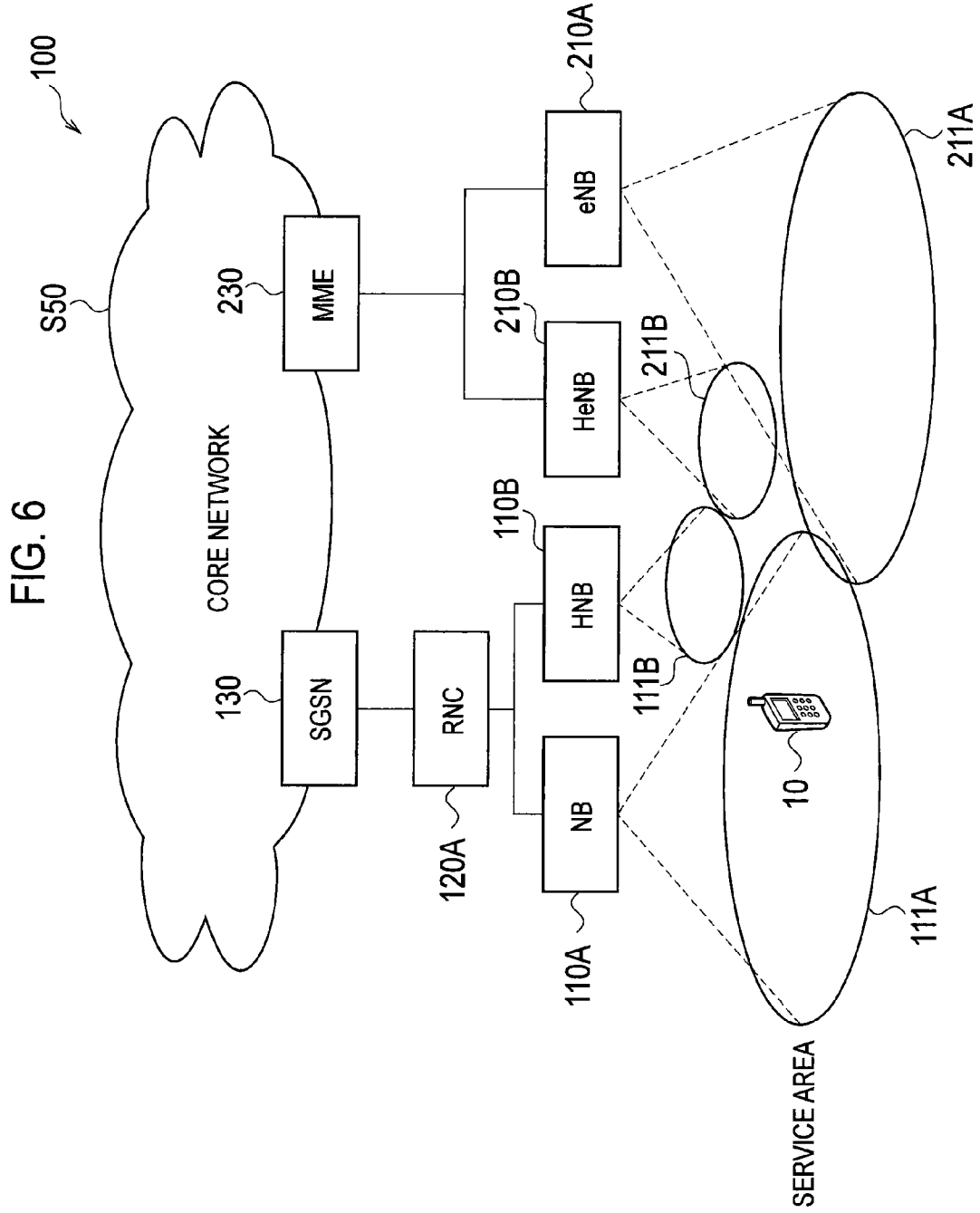
FIG. 6 is a diagram showing a mobile communication system 100 according to Modification 1.

Specifically, in the first embodiment, a host node of the HNB 110B is an HNB-GW120B. On the other hand, in Modification 1, as shown in FIG. 6, a host node of the HNB 110B is a RNC 120A.

In Modification 1, the RNC 120A manages the HNB 110B in place of the HNB-GW 120B. In other words, the RNC 120A provides functions similar to those of the HNB-GW 120B to a device residing in under the control of the RNC 120A.

In addition, in the first embodiment, a host node of the HeNB 210B is the HeNB-GW 220B. On the other hand, in Modification 1, as shown in FIG. 6, a host node of the HeNB 210B is an MME 230.

In Modification 1, the HeNB 210B provides functions similar to those of the HeNB-GW 220B to a device residing in under control of the HeNB 210B in place of the HeNB-GW 220B.

Note that only the HBN-GW 120B may be omitted or only the HeNB-GW 220B may be omitted.

[Modification 2]

Modification 2 of the first embodiment is described below by referring to the drawings. In the following description, portions different from those of the first embodiment are mainly described.

In the first embodiment, there is given of the case as an example of UTRAN corresponding to UMTS and E-UTRAN corresponding to LTE as a radio access network. However, the embodiment is not limited to that configuration.

Figure 7:
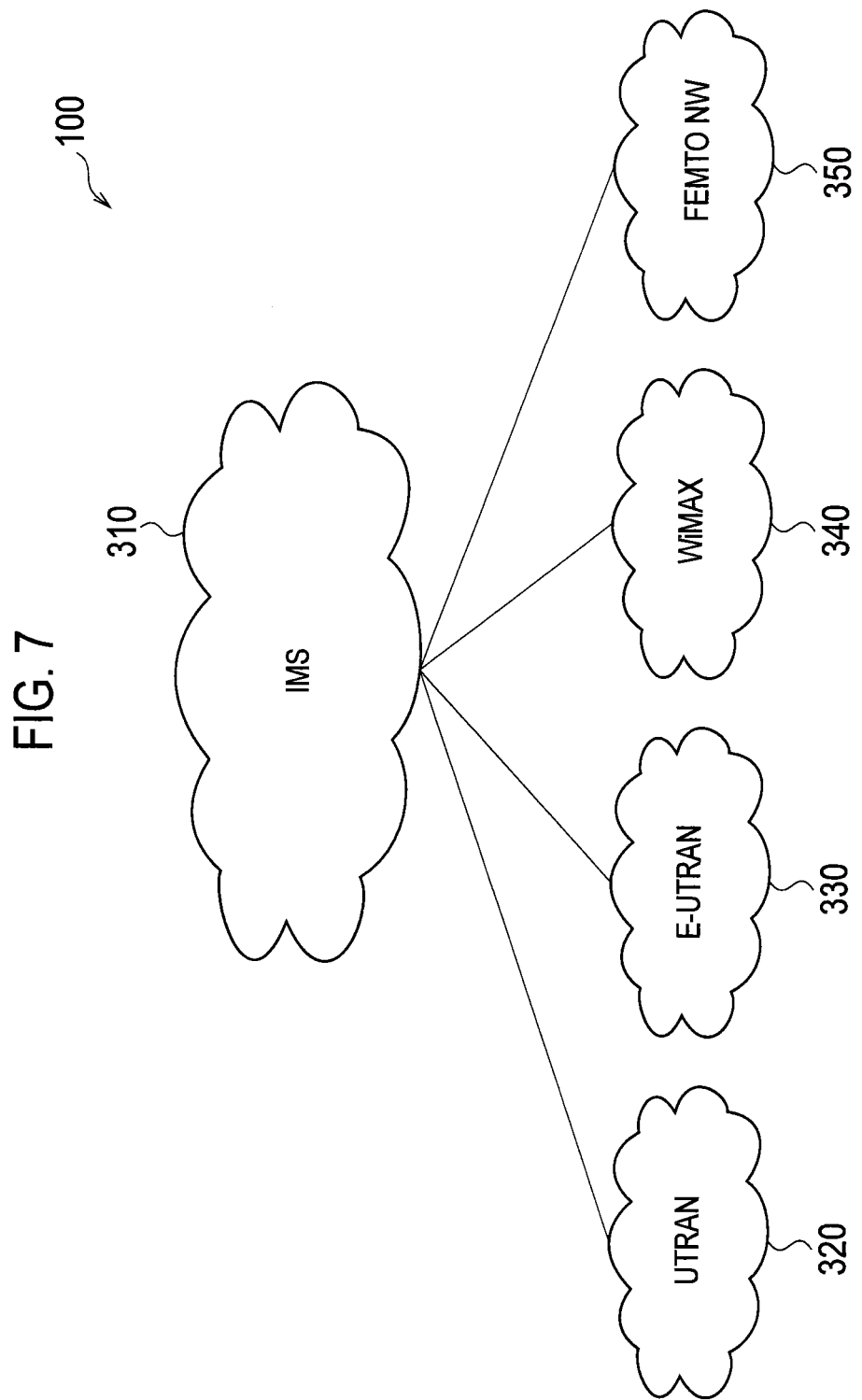
FIG. 7 is a diagram showing a mobile communication system 100 according to Modification 2.

Specifically, as shown in FIG. 7, a UTRAN 320, an E-UTRAN 330, a WiMAX 340, a femtoNW 350 and the like are possible as a radio access network. Note that these radio access networks are connected with an IMS (IP Multimedia Subsystem) 310. The femtoNW 350 is a radio access network having the above-described specific cell.

Here, the first embodiment in which it is determined whether the reception quality of a signal broadcasted from the specific cell provided in the femtoNW 350 is applicable to a case where the UE 10 is present in the UTRAN 320, E-UTRAN 330, or WiMax 340.

[Other Embodiments]

The present invention has been described by using the above-described embodiments. However, it should not be understood that the description and the drawings, which constitute one part of this disclosure, are to limit the present invention. Various alternative embodiments, examples, and operational techniques will be obvious for those who are in the art from this disclosure.

In the above-described embodiment, there is given of the case where it is determined whether or not to measure the reception quality of a signal broadcasted from the specific cell 211B when the UE 10 is present in the macrocell 111A. However, the embodiment is not limited to that case. Specifically, it may be determined whether or not to measure the reception quality of a signal broadcasted from the specific cell 111B when the UE 10 is present in the macrocell 111A. Also, it may be determined whether or not to measure the reception quality of a signal broadcasted from the specific cell 111B or the specific cell 111B when the UE 10 is present in the macrocell 111A.

Note that operations of the above-described UE 10 may be implemented by hardware or may be implemented by a software module to be executed by a processor, or may be implemented in combination of the both.

The software module may be provided in any form of recording medium such as RAM (Random Access Memory), a flash memory, ROM (Read Only Memory), EPROM (Erasable Programmable ROM), EEPROM (Electronically Erasable and Programmable ROM), register, hard disk drive, removable disk, or CD-ROM.

Such recording medium is connected with a processor so that the processor can read and write information on the recording medium. Instead, such recording medium may be integrated on the processor. Alternatively, such recording medium and the processor may be provided inside ASI. Such ASIC may be provided inside the UE 10. Otherwise, such recording medium and the processor may be provided inside the UE 10 as discrete components.

Note that the contents of Japan Patent Application Publication No. 2009-272450 (filed on Nov. 30, 2009) are hereby incorporated by reference in their entirety.

Industrial Applicability

The present invention can provide a mobile communication terminal capable of causing a reception quality of a signal broadcasted from a specific cell to be selectively measured/reported, a network device, a mobile communication system, and a mobile communication method, thus is useful in radio communications and the like.

Explanation of the Reference Numerals
10 communication terminal device
11 communication unit
12 determination unit
13 measuring unit
14 reporting unit
20 network device
21 communication unit
22 determination unit
23 instruction unit
110A NB
110B HNB
111A macrocell
111B specific cell
120A RNC
120B HNB-GW
130 SGSN
210A eNB
210B HeNB
211A macrocell
211B specific cell
220B HeNB-GW
230 MME
50 core network
100 mobile communication system
310 IMS
320 UTRAN
330 E-UTRAN
340 WiMAX
350 femtoNW

The invention claimed is:

1. A mobile communication terminal configured to communicate with a network device in a mobile communication system including a specific cell having a configurable access mode, the mobile communication terminal comprising:
   circuitry configured to
      determine whether to measure a reception quality of a signal broadcasted from the specific cell based on at least one piece of information of a moving speed of the mobile communication terminal and a usage state of the specific cell; and
      measure the reception quality of the signal broadcasted from the specific cell if it is determined that the reception quality of the signal broadcasted from the specific cell is to be measured, wherein
   the determining includes at least one of
      determining to measure the reception quality of the signal broadcasted from the specific cell when the moving speed of the mobile communication terminal is equal to or less than a predetermined threshold value, and to not measure the reception quality of the signal broadcasted from the specific cell when the moving speed of the mobile communication terminal is greater than the predetermined threshold value; and
      determining to measure the reception quality of the signal broadcasted from the specific cell when the usage state of the specific cell corresponds to a first usage state and to not measure the reception quality of the signal broadcasted from the specific cell when the usage state of the specific cell corresponds to a second usage state.

2. The mobile communication terminal according to claim 1, wherein the circuitry is configured to report to the network device whether the mobile communication terminal has a right to access the specific cell.

3. The mobile communication terminal according to claim 1, wherein the circuitry is configured to report an identifier of the specific cell to the network device.

4. A network device configured to communicate with a mobile communication terminal in a mobile communication system including a specific cell having a configurable access mode, the network device comprising:
   circuitry configured to
      determine whether to cause the mobile communication terminal to measure a reception quality of a signal broadcasted from the specific cell based on at least one piece of information of a moving speed of the mobile communication terminal and a usage state of the specific cell; and
      instruct the mobile communication terminal to measure the reception quality of the signal broadcasted from the specific cell if it is determined that the mobile communication terminal is to measure the reception quality of the signal broadcasted from the specific cell, wherein
   the determining includes at least one of
      determining to cause the mobile communication terminal to measure the reception quality of the signal broadcasted from the specific cell when the moving speed of the mobile communication terminal is equal to or less than a predetermined threshold value, and to not cause the mobile communication terminal to measure the reception quality of the signal broadcasted from the specific cell when the moving speed of the mobile communication terminal is greater than the predetermined threshold value; and
      determining to cause the mobile communication terminal to measure the reception quality of the signal broadcasted from the specific cell when the usage state of the specific cell corresponds to a first usage state and to not cause the mobile communication terminal to measure the reception quality of the signal broadcasted from the specific cell when the usage state of the specific cell corresponds to a second usage state.

5. The network device according to claim 4, wherein the circuitry is configured to instruct the mobile communication terminal to report an identifier of the specific cell.

6. A network device configured to communicate with a mobile communication terminal in a mobile communication system including a specific cell having a configurable access mode, the network device comprising:
   circuitry configured to
      instruct the mobile communication terminal to report whether or not the mobile communication terminal has a right to access the specific cell;

determine whether to cause the mobile communication terminal to measure a reception quality of a signal broadcasted from the specific cell based on at least one piece of information of a moving speed of the mobile communication terminal and a usage state of the specific cell; and instruct the mobile communication terminal to measure the reception quality of the signal broadcasted from the specific cell if it is determined that the mobile communication terminal is to measure the reception quality of the signal broadcasted from the specific cell.

7. A network device configured to communicate with a mobile communication terminal in a mobile communication system including a specific cell having a configurable access mode, the network device comprising:

circuitry configured to instruct the mobile communication terminal of an access mode set for the specific cell whose reception quality has to be measured by the mobile communication terminal;

determine whether to cause the mobile communication terminal to measure a reception quality of a signal broadcasted from the specific cell based on at least one piece of information of a moving speed of the mobile communication terminal and a usage state of the specific cell; and instruct the mobile communication terminal to measure the reception quality of the signal broadcasted from the specific cell if it is determined that the mobile communication terminal is to measure the reception quality of the signal broadcasted from the specific cell.

8. A mobile communication system including a specific cell having a configurable access mode, the mobile communication system comprising:

circuitry configured to determine whether to measure a reception quality of a signal broadcasted from the specific cell based on at least one piece of information of a moving speed of the mobile communication terminal and a usage state of the specific cell, wherein the mobile communication terminal is configured to measure the reception quality of the signal broadcasted from the specific cell when it is determined that the reception quality of a signal broadcasted from the specific cell is to be measured, and the determining includes at least one of determining to measure the reception quality of the signal broadcasted from the specific cell when the moving speed of the mobile communication terminal is equal to or less than a predetermined threshold value, and to not measure the reception quality of the signal broadcasted from the specific cell when the moving speed of the mobile communication terminal is greater than the predetermined threshold value; and determining to measure the reception quality of the signal broadcasted from the specific cell when the usage state of the specific cell corresponds to a first usage state and to not measure the reception quality of the signal broadcasted from the specific cell when the usage state of the specific cell corresponds to a second usage state.

9. A mobile communication method applied to a mobile communication system including a specific cell having a configurable access mode, the mobile communication method comprising:

determining whether to measure a reception quality of a signal broadcasted from the specific cell based on at least one piece of information of a moving speed of the mobile communication terminal and a usage state of the specific cell; and measuring the reception quality of the signal broadcasted from the specific cell by the mobile communication terminal when it is determined that the reception quality of a signal broadcasted from the specific cell is to be measured, wherein the determining includes at least one of determining to measure the reception quality of the signal broadcasted from the specific cell when the moving speed of the mobile communication terminal is equal to or less than a predetermined threshold value, and to not measure the reception quality of the signal broadcasted from the specific cell when the moving speed of the mobile communication terminal is greater than the predetermined threshold value; and determining to measure the reception quality of the signal broadcasted from the specific cell when the usage state of the specific cell corresponds to a first usage state and to not measure the reception quality of the signal broadcasted from the specific cell when the usage state of the specific cell corresponds to a second usage state.

* * * * *